(12) United States Patent
Onaka

(10) Patent No.: US 8,514,484 B2
(45) Date of Patent: Aug. 20, 2013

(54) OPTICAL AMPLIFIER AND OPTICAL FIBER

(75) Inventor: Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 233 days.

(21) Appl. No.: 13/091,500

(22) Filed: Apr. 21, 2011

(65) Prior Publication Data

US 2011/0292500 A1    Dec. 1, 2011

(30) Foreign Application Priority Data

May 26, 2010    (JP) ................................. 2010-120665

(51) Int. Cl.
     *H01S 3/02*      (2006.01)
     *H01S 3/106*      (2006.01)

(52) U.S. Cl.
     USPC .................................. 359/337.2; 359/337.21

(58) Field of Classification Search
     USPC ................... 359/337, 337.2, 337.21
     See application file for complete search history.

(56) References Cited

U.S. PATENT DOCUMENTS

| | | | |
|---|---|---|---|
| 5,430,817 A * | 7/1995 | Vengsarkar | 385/37 |
| 6,134,046 A | 10/2000 | Shukunami et al. | |
| 6,141,142 A | 10/2000 | Espindola et al. | |
| 6,414,787 B2 * | 7/2002 | Lutz et al. | 359/337.21 |
| 7,495,825 B2 * | 2/2009 | Liu et al. | 359/337.21 |

FOREIGN PATENT DOCUMENTS

| | | |
|---|---|---|
| JP | 11-121838 A | 4/1999 |
| JP | 2000-244040 A | 9/2000 |

* cited by examiner

*Primary Examiner* — Mark Hellner
(74) *Attorney, Agent, or Firm* — Fujitsu Patent Center

(57) ABSTRACT

An optical amplifier includes an optical fiber which includes a core in which the signal light is propagated and with which a rare-earth element is doped; a laser that is optically coupled to an end of the optical fiber, providing the optical fiber with an excitation light; and a filter which is formed in the optical fiber and removes a light within a wavelength range, from the core, among lights propagated in the core, wherein the filter comprises a first filter that is arranged at a stage of the optical fiber and removes a first light in a first wavelength range, and a second filter that is arranged at a subsequent stage of the optical fiber and removes a second light in a second wavelength range, wherein a wavelength of the second light is longer than a wavelength of the first light.

14 Claims, 15 Drawing Sheets

FIG. 8

| SIGNAL LIGHT WAVELENGTH | WAVELENGTH RANGE OF LIGHT THAT IS PREFERABLY REMOVED |
|---|---|
| C-band (1530-1561nm) | 1529nm, 1570nm |
| L-band (1570.4-1607.04nm) | 1530nm, 1570nm |
| 1530nm | 1529nm, 1570nm |
| 1550nm | 1530nm, 1570nm |

US 8,514,484 B2

OPTICAL AMPLIFIER AND OPTICAL FIBER

CROSS-REFERENCE TO RELATED APPLICATIONS

This application is based upon and claims the benefit of priority from the prior Japanese Patent Application No. 2010-120665 filed on May 26, 2010, the entire contents of which are incorporated herein by reference.

1. Field

The embodiments discussed herein are related to an optical amplifier device and to an optical fiber.

2. Background

As communication traffic has been increased in recent years, an optical communication system is in high demand. The optical communication system has an Erbium Doped Fiber Amplifier (EDFA) for each transmission path to amplify a signal light that is propagated in the transmission path. An optical amplification relay system that realizes high capacity and long-distance transmission is mainly used as the optical communication system. The EDFA is an example of an amplifier of a signal light using an optical fiber with a core added with Erbium, a rare-earth element. The EDFA amplifies the signal light, which is propagated in the core, by irradiating an excitation light in the optical fiber to generate inverted population inside the core. When the EDFA is used, however, because of an influence of Amplified Spontaneous Emission (ASE) light generated inside the core, the transmission characteristics may deteriorate due to deterioration in signal-to-noise (S/N) as a ratio of a power of a signal light and a power of a noise light.

For example, Japanese Laid-open Patent Publication No. 11-121838 and Japanese Laid-open Patent Publication No. 2000-244040 disclose a technique for providing a fiber grating that removes a specific wavelength range from the core to remove the influence of the ASE light.

SUMMARY

According to an aspect of the invention, an optical amplifier includes an optical fiber which includes a core in which the signal light is propagated and with which a rare-earth element is doped; a laser that is optically coupled to an end of the optical fiber, providing the optical fiber with an excitation light; and a filter which is formed in the optical fiber and removes a light within a wavelength range, from the core, among lights propagated in the core, wherein the filter comprises a first filter that is arranged at a stage of the optical fiber and removes a first light in a first wavelength range, and a second filter that is arranged at a subsequent stage of the optical fiber and removes a second light in a second wavelength range, wherein a wavelength of the second light is longer than a wavelength of the first light.

The object and advantages of the invention will be realized and attained at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 8 is a diagram illustrating an example of a wavelength range of a light that is preferably removed with respect to a signal band of an input signal light;

DESCRIPTION OF EMBODIMENTS

With reference to the diagrams, embodiments of the present invention will be described below.

Figure 1:
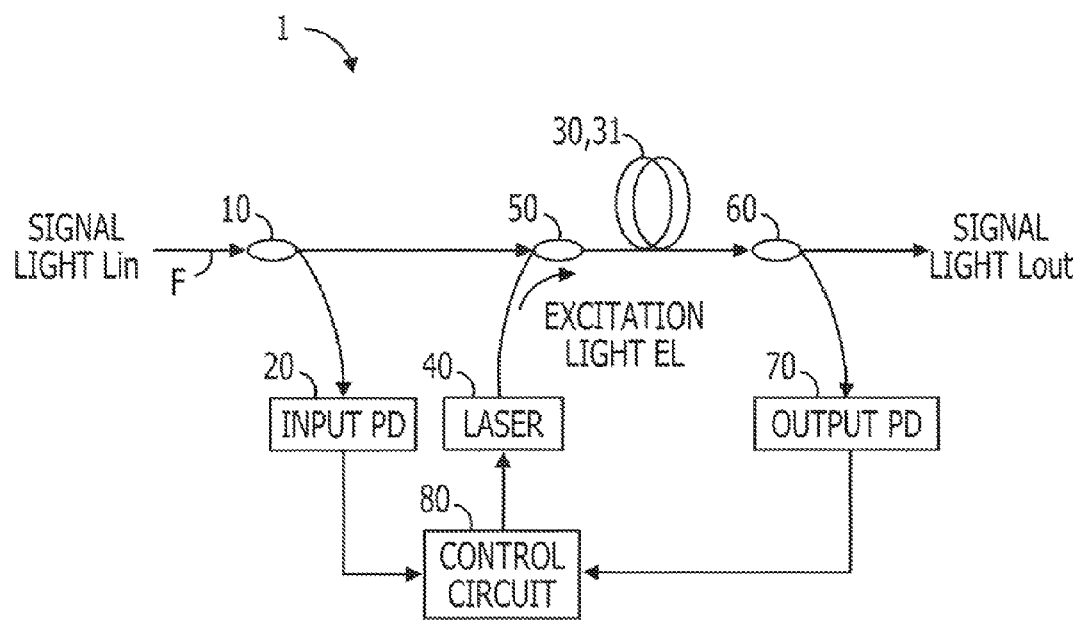
FIG. 1 is a diagram illustrating an example of an optical amplifier in an optical communication system.

With reference to FIG. 1, an optical amplifier 1 according to the embodiment will be described. FIG. 1 is a diagram illustrating an example of the optical amplifier 1 provided in an optical communication system using an optical fiber.

The optical amplifier 1 includes an optical fiber F in which a signal light L is propagated, an input Photo Detector (PD) 20 and an output PD 70 as a PD for signal optical power measurement, an optical fiber 30 added with a rare-earth element, and a laser 40 that provides an excitation light with the optical fiber 30. The optical amplifier 1 includes a control circuit 80 that controls a power of the excitation light provided by the laser 40 after receiving an input of a measurement value from the input PD 20 and the output PD 70, respectively.

On the optical fiber F, a coupler 10 as an optical branch used to enter part of an input signal light Sin into the input PD 20, a coupler 50 used to input an excitation light EL into the optical fiber F from the laser 40, and a coupler 60 used to enter part of an output signal light Sout into the output PD 70 are provided.

Part of an input signal light Lin propagated in the optical fiber F and entered into the optical amplifier 1 is branched by the coupler 10 and is then entered into the input PD 20. The input PD 20 measures the power of the received input signal light Lin and reports the power as an input power Pin to the control circuit 80.

The optical fiber 30 is an optical fiber added with a rare-earth element such as Erbium, for example. The optical fiber 30 is coupled so that the signal light L may be input into the optical fiber F. Inside the optical fiber 30, inverted population is generated by the excitation light EL that is provided from the laser 40. The input signal light Lin is amplified by conductive emission by passing through the inverted population.

Figure 2:
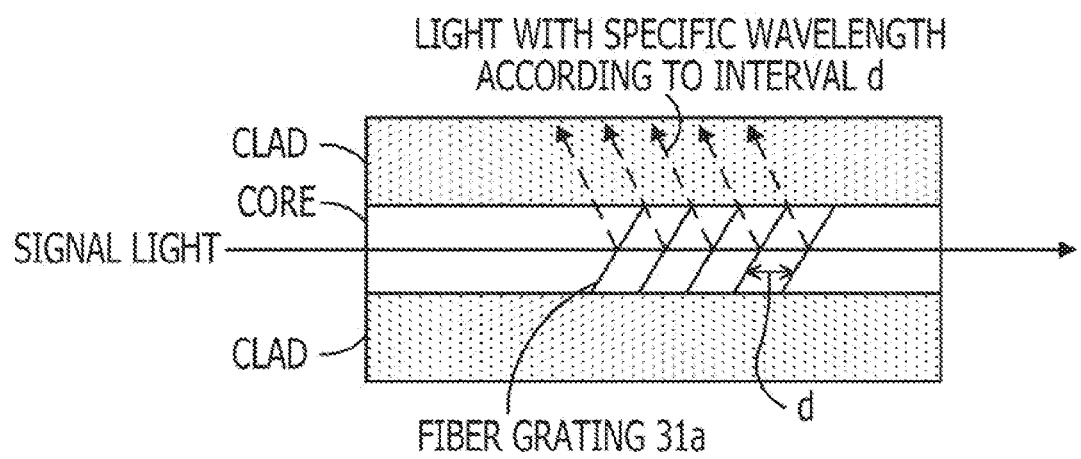
FIG. 2 is a diagram illustrating an example of a fiber grating that is formed in an optical fiber.

Inside a core of the optical fiber 30, a filter 31, which removes a light of a specific wavelength range propagating in the core, is formed. For example, a fiber grating is formed as the filter 31. With reference to FIG. 2, a configuration given as an example of the optical fiber 30 and the filter 31 is described.

FIG. 2 is an example of a cross-sectional view of the optical fiber 30 viewed from a direction orthogonal to the direction in which a light is propagated. The optical fiber 30 includes a core added with a rare-earth element such as Erbium, for example, and a clad formed around the core. A fiber grating (or a Fiber Bragg Grating (FBG)) 31a as an example of the filter 31 is an assembly of parts formed by laser irradiation to the optical fiber 30 and have refractive indexes that are different from the refraction indexes of other parts. In other words, the fiber grating 31a is an assembly of Bragg diffraction gratings formed in the core of the optical fiber 30.

An interval of the diffraction gratings of the fiber grating 31a (in other words, the interval of the parts with various refraction indexes) is set according to the wavelength range of the light that is removed. That is, to remove the light with a specific wavelength, the light with the specific wavelength is reflected on a diffraction grating surface by a diffraction grating provided in an interval set to according to the specific wavelength. The fiber grating 31a is a tilt-shaped fiber grating that is formed in such a way that each diffraction grating surface has an angle that is not orthogonal or parallel to a propagation direction of the light in the optical fiber 30. According to the fiber grating 31a, the light of the target specific wavelength is reflected on the diffraction grating surface and is then entered into the clad. Thus, the light with the specific wavelength is removed from the core. For example, an absorber, which preferably absorbs a light entered from the core, may be used as a clad.

FIG. 1 will be described below. The laser 40 is an excitation light source from which the excitation light EL is provided to the optical fiber 30. A semiconductor laser is preferably used as the laser 40. The excitation light EL radiated from the laser 40 is synthesized, by the coupler 50, with the input signal light Lin propagated in the optical fiber F, and is then entered into the optical fiber 30. The excitation light EL generates inverted population by exciting electrons in the optical fiber 30. A degree of the generated inverted population varies according to the power of the excitation light EL or the like. As described below, an amplification gain of the input signal light Lin in the optical fiber 30 varies according to an inverted population rate Ra indicating the degree of the inverted population in the optical fiber 30. The laser 40 is configured in such a way that the power of the provided excitation light EL or the like is changeable under control of the control circuit 80.

Part of an output signal light Lout output from the optical fiber 30 is branched by the coupler 60 and is then entered into the output PD 70. The output PD 70 measures the power of the received output signal light Lout and reports the power as an output power Pout to the control circuit 80.

The control circuit 80 includes a CPU, which controls operations of the laser 40 and the other units, an information storage memory, and the like. Based on the input power Pin of the input signal light Lin reported from the input PD 20 and on the output power Pout of the output signal light Lout reported from the output PD 70, the control circuit 80 calculates the amplification gain of the input signal light Lin in the optical fiber 30. The control circuit 80 receives a report such as a dynamic range of an optical device provided in a latter stage of the optical amplifier 1 and a request value of the output power Pout of the output signal light Lout. The control circuit 80 performs control to change the excitation light power of the laser 40 to adjust the amplification grain in the optical fiber 30.

Figure 3:
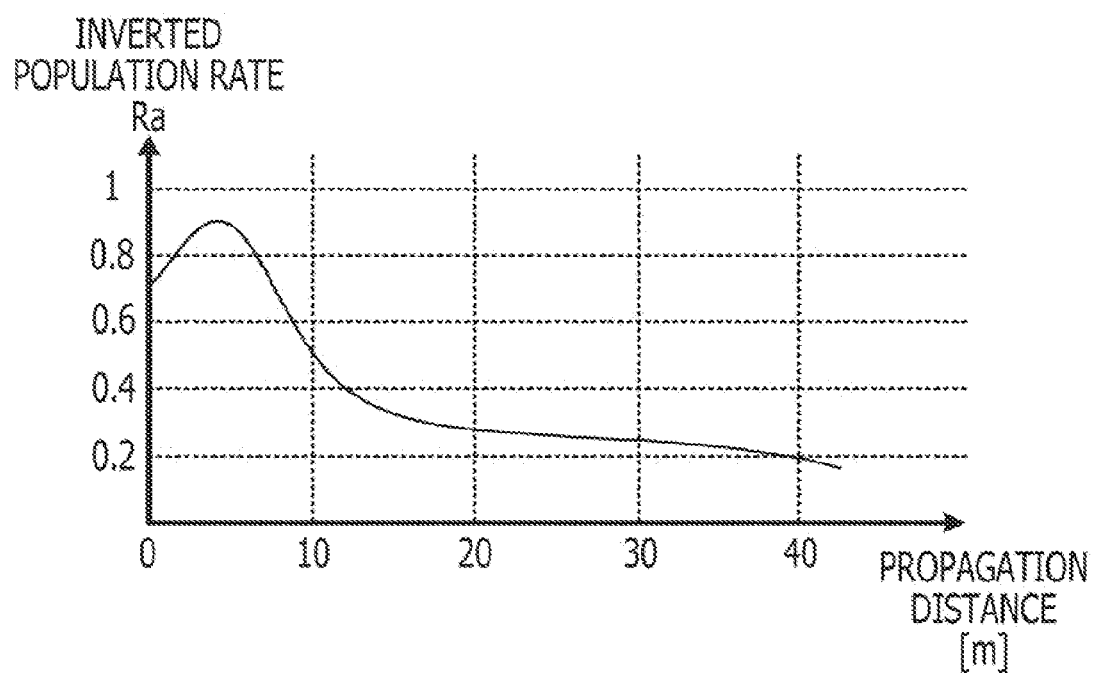
FIG. 3 is a graph illustrating an example of a relation between a propagation distance of an excitation light in an optical fiber and an inverted population rate caused by the excitation light.

The excitation light EL provided from the laser 40 may cause inverted population by exciting the electrons in a media while being propagated in the optical fiber 30. The inverted population rate Ra, which indicates a ratio of the inverted population that contributes to the amplification in the optical fiber 30, largely depends on a distance in the propagation direction of the light. The inverted population rate Ra is high in an area close to the incidence end in which the power of the excitation light EL is large and the signal light power is small. The power of the excitation light EL is used to excite the electrons in the optical fiber 30. Therefore, the power of the excitation light EL decreases according to the propagation distance in the optical fiber 30. Since the signal light subjected to the amplification receives energy from more excited electrons for further amplification, the inverted population rate Ra decreases as the propagation distance is extended. FIG. 3 is an example of a graph illustrating a mode of the inverted population rate Ra that decreases according to the propagation distance of the excitation light EL in the optical fiber 30. In the example illustrated in FIG. 3, there is a peak where the inverted population rate Ra is highest in a position approximately 5 m away from the incidence end in the optical fiber 30. In the position 5 m or farther away from the incidence end, the inverted population rate Ra decreases according to the propagation distance.

Figure 4:
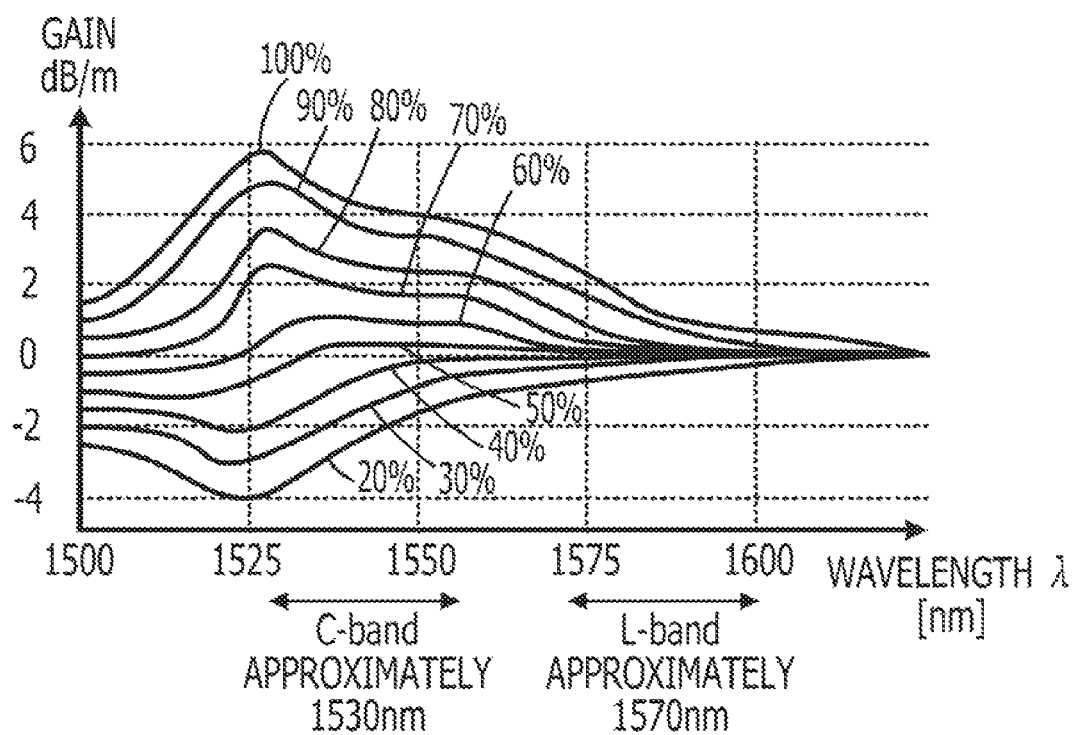
FIG. 4 is a graph illustrating an example of a gain wavelength characteristic for each inverted population ratio in an optical fiber.

The amplification gain of the input signal light Lin in the optical fiber 30 varies according to the wavelength of the input signal light Lin and the inverted population rate in the optical fiber 30. FIG. 4 is a graph illustrating an example of a relation between the wavelength of the input signal light Lin and the amplification gain according to the inverted population rate in the optical fiber 30.

As illustrated in FIG. 4, a characteristic, which indicates an amplification gain (dB/m) per unit length in the optical fiber 30 (hereinafter referred to as a gain wavelength characteristic) with respect to the wavelength of the input signal light Lin, is in various forms according to the inverted population rate Ra in the optical fiber 30. Specifically, if the inverted population rate Ra is relatively high such as 70% or higher, there is a peak where the amplification gain is highest in a band of approximately 1530 nm to 1561 nm, which is generally called C-band. On the other hand, if the inverted population rate Ra is lower than 70%, the peak where the amplification gain is highest in the C-band is not conspicuous. If the inverted population rate Ra is relatively low such as 30% or lower, there is an inverse peak where the amplification gain further decreases. Meanwhile, in a band that is generally called L-band of approximately 1570.4 nm to 1607.04 nm, the amplification gain increases if the inverted population rate Ra is lower than 70%.

Figure 5:
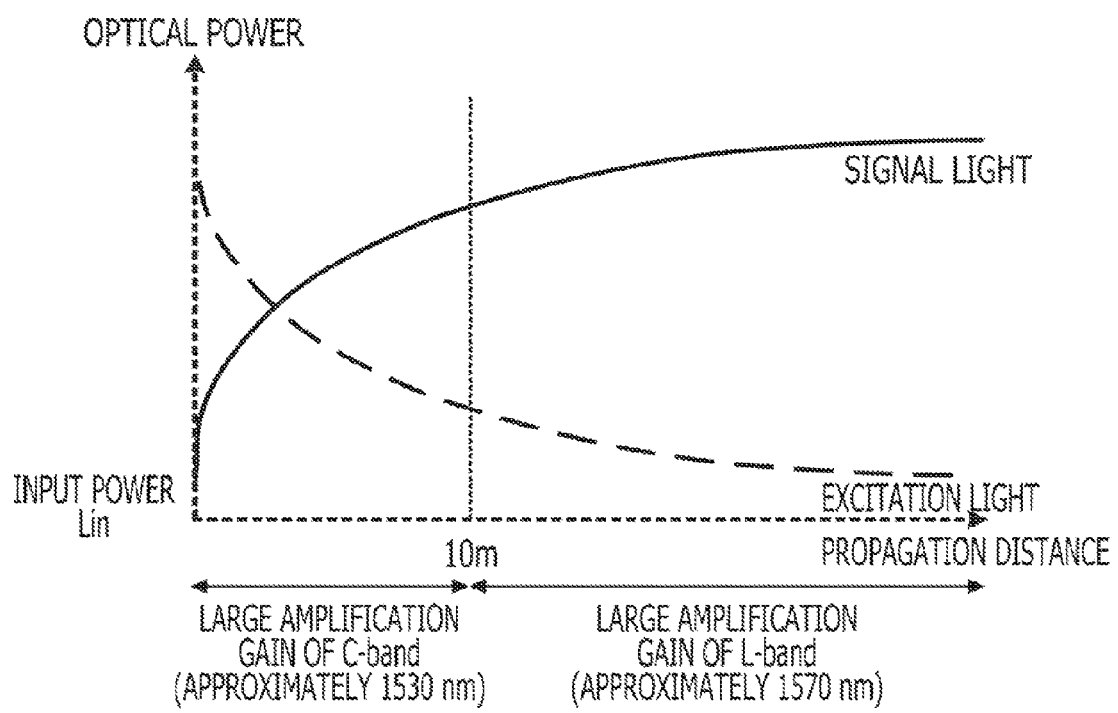
FIG. 5 is a graph illustrating an example of a relation between a propagation distance and an optical power in an optical fiber.

Based on the above description, a relation between the power of each of the signal light and the excitation light and the propagation distance in the optical fiber 30 is illustrated in the graph in FIG. 5. That is, the power of the excitation light EL entered into the optical fiber 30 decreases according to the propagation distance in the optical fiber 30. On the other hand, the power of the signal light, which is entered into the optical fiber 30 by the input power Lin, is amplified according to the propagation distance in the optical fiber 30.

In the graph illustrated in FIG. 5, in the area in which the peak of the inverted population rate Ra is generated if the propagation distance in the optical fiber 30 is 0 to 10 m, the amplification gain of the band of approximately 1530 nm (hereinafter, referred to as 1530 nm band) increases as described in FIG. 4. Accordingly, in this area, the amplification gain of the signal light and the noise light of the wavelength area belonging to the 1530 nm band increases, so that deterioration in the S/N caused by the amplified noise light may occur. Since the light of the wavelength area belonging to the 1530 nm band selectively obtains a high amplification gain, a power difference due to a difference of the amplification gain for the light of each wavelength in the signal light band may be generated.

On the other hand, in the area 10 m or farther away from the incidence end, the amplification gain of the band of approximately 1570 nm (hereinafter, referred to as 1570 nm band) increases. Accordingly, in this area, the amplification gain of the signal light and the noise light in the wavelength area belonging to the 1570 nm band increases, so that the deterioration in the S/N caused by the amplified noise light may occur. Since the light of the wavelength area belonging to the 1570 nm band obtains a high amplification gain, a power difference due to the difference of the amplification gain for the light of each wavelength in the signal light band may be generated.

Figure 6A:
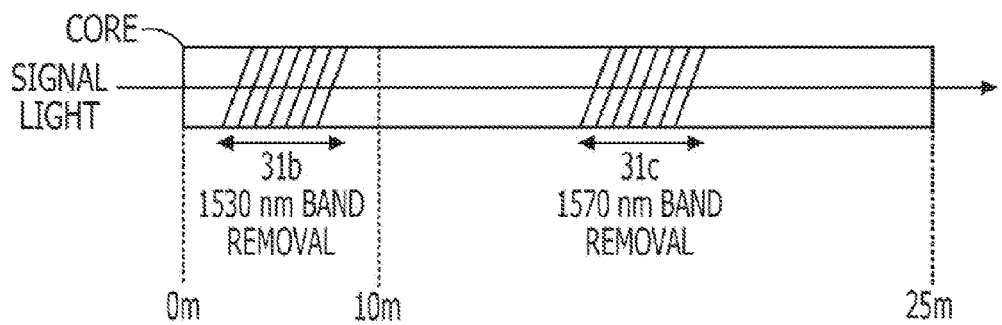
FIGS. 6A to 6C are diagrams illustrating examples of a fiber grating provided in an optical fiber.
Figure 6B:
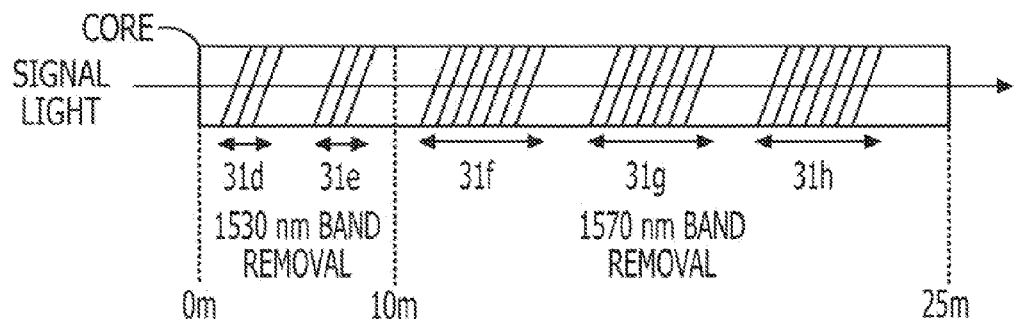
Figure 6C:
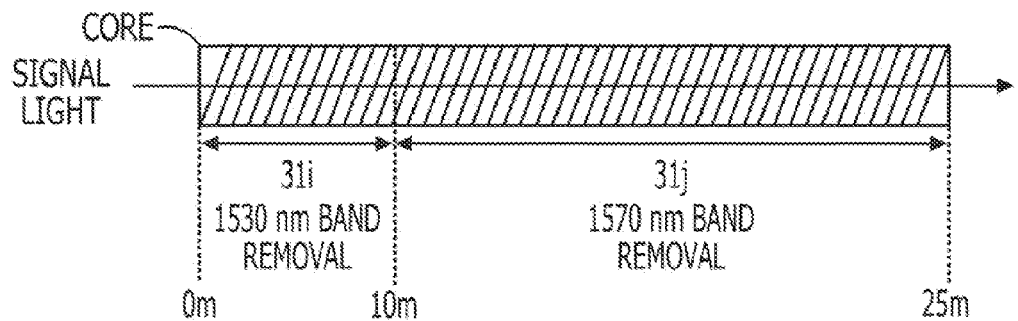

FIG. 6A to 6C are diagrams illustrating examples of and a formation position of the fiber grating 31a and the wavelength of the light that is removed with respect to the fiber grating 31a as an example of the filter 31 formed in the optical fiber 30. FIG. 6A is a diagram illustrating a first example of the filter 31 in the optical fiber 30 included in the optical amplifier 1. As illustrated in FIG. 6A, in the first example, a fiber grating 31b, which removes the light belonging to the 1530 nm band, is formed in the area up to 10 m away from the incidence end in the optical fiber 30. In the area 10 m or farther away from the incidence end, a fiber grating 31c that removes the light belonging to the 1570 nm band is formed.

Due to an amplification effect by the optical fiber 30, the light belonging to the 1530 nm band selectively obtains a high amplification gain in the area up to 10 m away from the incidence end. Therefore, in the area up to 10 m away from the incidence end in the optical fiber 30, a large quantity of the noise light belonging to the 1530 nm band is generated. Consequently, the fiber grating 31b may selectively remove the noise light, which belongs to the 1530 nm band and obtains a high amplification gain in the area where the fiber grating 31b is provided.

By removing the noise light such as the ASE light propagated in the optical fiber 30, a level of the noise light in the light propagated in the optical fiber 30 may be suppressed. Accordingly, the inverted population in the optical fiber 30 is reduced or prevented from being consumed for amplification of the noise light other than the input signal light Lin, so that the amplification efficiency to the input signal Lin is improved. Due to the removal of the noise light and the suppression of the amplification, the transmission characteristics such as the S/N of the input signal light Lin are improved.

On the other hand, due to the amplification effect by the optical fiber 30, the light belonging to the 1570 nm band obtains a high amplifier gain in the area 10 m or farther away from the incidence end. Therefore, in the area 10 m or farther away from the incidence end in the optical fiber 30, a large quantity of noise light belonging to the 1570 nm band is generated by the amplification. Accordingly, the fiber grating 31c selectively removes the noise light belonging to the 1570 nm band that obtains a high amplification gain in the area where the fiber grating 31c is provided.

If the input signal light Lin, which is entered into the optical amplifier 1 with the above-described configuration, includes a plurality of signal lights with various wavelengths belonging to the signal band, at least some of the wavelengths of the signal lights may belong to the above-described 1530 nm band or 1570 nm band. At this time, the signal light belonging to the signal band is removed as well by the fiber grating. Specifically, the fiber grating 31b, which is provided in the area up to 10 m away from the incidence end, selectively removes the signal light that belongs to the 1530 m band and obtains a high amplification gain in the area up to 10 m away from the incidence end. The fiber grating 31c, which is provided in the area 10 m or farther away from the incidence end, selectively removes the signal light that belongs to the 1570 m band and obtains a high amplification gain in the area 10 m or farther away from the incidence end.

As described above, among the signal lights with various wavelengths included in the input signal light Lin, the signal band with a high amplification gain is selectively removed, so that the amplification gain of the signal light of each wavelength included in the input signal light Lin is smoothed. Therefore, excessive amplification is reduced or prevented from being performed on the signal lights with some of the wavelengths in the signal band. This may improve the amplification efficiency of the signal lights with all the wavelengths included in the input signal light Lin.

With reference to FIG. 6B, a second configuration example of the filter 31 included in the optical amplifier 1 will be described. As illustrated in FIG. 6B, in the second configuration example, fiber gratings 31d and 31e, which remove the light belonging to the 1530 nm band, are formed in the area up to 10 m away from the incidence end in the optical fiber 30, and fiber gratings 31f, 31g, and 31h, which remove the light belonging to the 1570 nm band, are formed in the area 10 m or farther away from the incidence end.

In the optical fiber 30 in which the inverted population is generated, the propagated light is continuously subjected to the amplification effect. Therefore, the power of the input signal light Lin propagated in the optical fiber 30 increases by being continuously amplified. On the other hand, by being continuously generated and propagated in the optical fiber 30, the noise light such as the ASE light is subjected to the amplification effect.

According to the second configuration example of the filter 31, in the area up to 10 m away from the incidence end, if the fiber grating 31d removes the light belonging to the 1530 m band, the noise light belonging to the 1530 nm band is suppressed, and the excessive amplification of the signal light is suppressed. Moreover, the fiber grating 31e removes the noise light, which belongs to the 1530 nm band newly generated on the output end side in the area where the fiber grating 31d is provided, and the excessive signal light.

In the area 10 m or farther away from the incidence end, the fiber grating 31f suppresses the noise light, which belongs to the 1570 m band, so that the excessive amplification of the signal light is suppressed. Furthermore, the fiber grating 31g removes the noise light, which belongs to the 1570 nm band newly generated on the output end side in the area where the fiber grating 31f is provided, and the excessive signal light. Moreover, the fiber grating 31h removes the noise light, which belongs to the 1570 nm band newly generated on the output end side in the area where the fiber grating 31g is provided, and the excessive signal light.

According to the second configuration example of the filter 31, the noise light that is continuously generated in the optical fiber 30 and the excessive signal light are removed by a plurality of provided fiber gratins, so that the generation of the noise light and the excessive amplification of the signal light may be suppressed.

In the example illustrated with reference to FIG. 6B, two fiber gratings, that is, the fiber grating 31d and the fiber grating 31e are provided in the area up to 10 m away from the incidence end. The number of the fiber gratings that remove the light belonging to the 1530 m band may be more than two. The number and the position of the fiber gratings in this case may be determined based on the generation of the noise light and the degree of the amplification of the signal light.

However, as the number of the provided fiber gratings increases, the removal amount of the signal light included in the 1530 nm band increases. Due to this, the number of the provided fiber gratings increases excessively. Thus, the amplification gain of the signal light decreases. At this time, deterioration of amplification efficiency caused by the excessive removal of the input signal light Lin and of the noise characteristics such as the S/N may occur. Accordingly, regarding the number of fiber grating provision or the removal amount of the light according to each fiber grating, embodiments that achieve preferable amplification efficiency of the signal light or noise characteristics are preferably determined by experiments, simulations, or the like.

The removal amount of the light in each fiber grating corresponds to a reflection rate in the fiber grating. The reflection rate varies according to the wavelength of a light that is to be reflected (in other words, a light that is to be removed). The reflection rate in the fiber grating depends on a fiber grating length and a degree of modulation of the refractive index in each fiber grating. Therefore, if the number of the provided fiber gratings increases, a preferable removal amount of the light may be set by changing each fiber grating length and each degree of modulation of the reflection rate.

Regarding the positions in which a plurality of fiber gratins is provided, if the fiber gratings are provided densely in one part of the area, another removal is performed by the next fiber grating before the generation of the noise light and the excessive amplification of the signal light occur after the removal is performed by the fiber grating. In this case, an improvement effect of the noise characteristics by the removal of the noise light decreases. However, the removal amount of the light in the signal band belonging to the 1530 m band increases. As a result, the amplification effect of the signal light may deteriorate.

Therefore, regarding the positions where the plurality of fiber gratings is provided, it is preferable that the second fiber grating is provided in a position separated by a prescribed distance in such a way that the first fiber grating removes a noise light and an excessive signal light that are newly generated in the area after the removal. When a third fiber grating is provided, it is preferable that the third fiber grating is provided in a position separated by the prescribed distance away from the second fiber grating on the output end side. If more fiber gratings are provided, the provision position of the first fiber grating is set to a position separated by a prescribed distance away from the incidence end. The provision positions may be periodically or distributedly set to be separated by the prescribed distance at a regular interval. At this time, the provision positions of the fiber gratings that may obtain the amplification effect and the noise characteristics of the preferable signal band are preferably determined by experiments or simulations, for example.

A description similar to the above descriptions is made of the fiber grating that is provided in the area 10 m away from the incidence end and that removes the light belonging to the 1570 nm band.

With reference to FIG. 6C, the third configuration example of the filter 31 included in the optical amplifier 1 will be described. As illustrated in FIG. 6C, in the third configuration example, a fiber grating 31i, which removes the light belonging to the 1530 nm band, is continuously formed in the area 10 m away from the incidence end in the optical fiber 30. In the area 10 m away from the input end up to the output end, a fiber grating 31j, which removes the light belonging to the 1570 m band, is continuously formed.

In the above-described configuration, the noise light continuously generated and the suppression of the excessive signal light may be removed. In the third configuration example, compared to the first and second configuration examples, the length of the fiber grating that is formed in the optical fiber 30 increases. Therefore, the modulation degree of the reflection rate of the fiber grating is adjusted in such a way that the removal amount of the light in the signal band is not excessive. Thus, the removal amount of the light per unit length is preferably set to be relatively low. This is an advantage in that production of fiber gratings is relatively easy.

(3) Deformed Example of Changeable Wavelength Range of Light that is Removed

As a deformed example of the optical amplifier 1, an embodiment that may change the wavelength range of the light that is removed by the filter 31 in the optical fiber 30 will be described.

Figure 7:
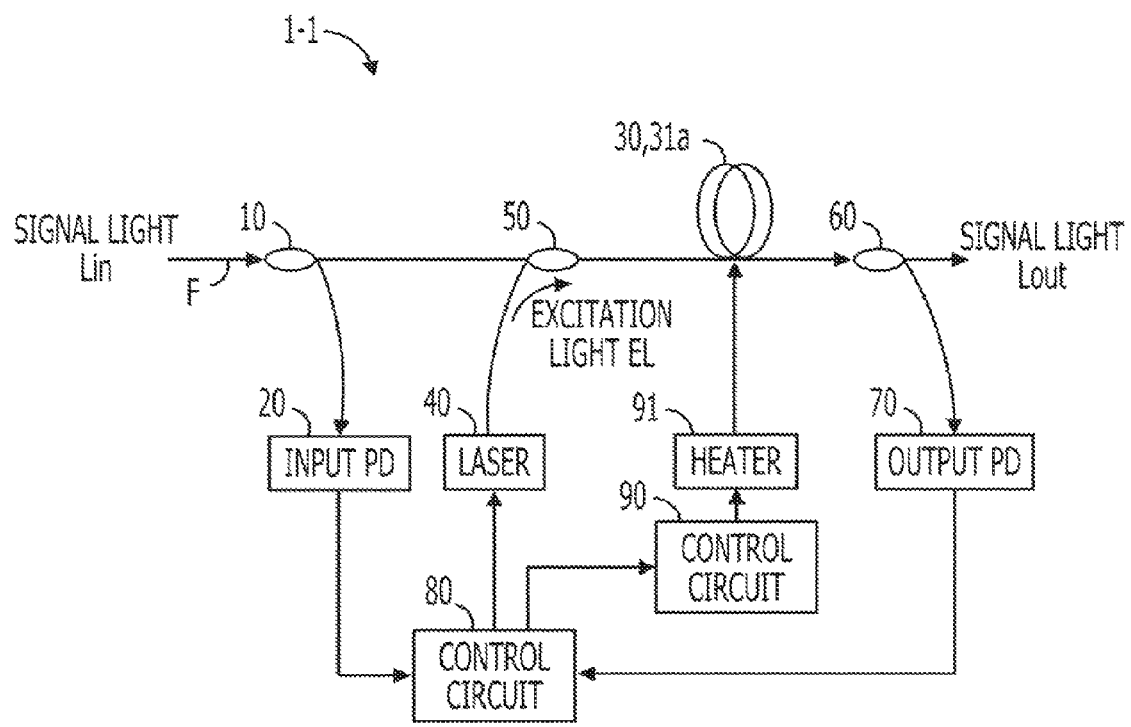
FIG. 7 is a diagram illustrating a first deformed example of an optical amplifier.

FIG. 7 is a block diagram illustrating an optical amplifier 1-1 as a first deformed example of the optical amplifier 1. In FIG. 7, parts indicated with the same numerals as in FIG. 1 may be substantially equivalent to the above-described optical amplifier 1, and the description is omitted.

As illustrated in FIG. 7, the optical amplifier 1-1 includes a reflection control circuit 90, which is coupled to the control circuit 80, and a heater 91, which is coupled to the reflection control circuit 90 and adjusts a temperature of the optical fiber 30 and of the fiber grating 31a as an example of the filter 31 in the optical fiber 30.

The reflection control circuit 90 includes, for example, a calculation circuit with a CPU or the like and a storage device such as a memory. The reflection control circuit 90 receives an input of the wavelength of the input signal light Lin from the control circuit 80 or the external circuit and reports an instruction of temperature adjustment to the heater 91. Specifically, based on the wavelength of the input signal light Lin, the reflection control circuit 90 determines a removal amount of the light, which is removed by the fiber grating 31a with respect to the wavelength, and instructs the heater 91.

The heater 91 is, for example, an optical fiber temperature adjustment heater, which is added with a rare-earth element, as an example of the optical fiber 30. The wavelength range of the light that is removed by the fiber grating 31a is changed by changing the temperature of the optical fiber 30 and the fiber grating 31a based on the instruction from the reflection control circuit 90.

With respect to the wavelength range of the input signal light Lin, the reflection control circuit 90 determines a wavelength range of the light that is preferably removed and instructs the heater 91 in such a way that the removal amount with respect to the wavelength range is appropriate. In this case, the "wavelength range of the light that is preferably removed" indicates a wavelength range of the noise light with respect to the wavelength of the input signal light Lin. By removing the light in the wavelength range, the amplification efficiency of the input signal light Lin and the noise characteristics of the output signal light Lout are improved.

FIG. 8 is an example of the wavelength range of the light that is preferably removed regarding the wavelength of the signal light included in the input signal light Lin. Regarding the signal light of the C-band of wavelength of approximately 1530 nm to 1561 nm, the light belonging to the 1529 nm band and the 1570 nm band as the noise light is preferably removed. Regarding the signal light of the L-band of wavelength of approximately 1570.4 nm to 1607.04 nm, the light belonging to the 1530 nm band and the 1570 nm band as the noise light is preferably removed. Regarding the signal light of the wavelength 1530 nm, the light belonging to the 1529 nm band and the 1570 nm band as the noise light is preferably removed. Regarding the signal light of the wavelength 1550 nm, the light belonging to the 1530 nm band and the 1570 nm band as the noise light is preferably removed.

In the reflection control circuit 90, the memory stores a database indicating the wavelength range of the light that is preferably removed with respect to the input signal light Lin that is entered into the optical amplifier 1-1. By referring to the wavelength of the input signal light Lin, which is input from the control circuit 80 or the like, and the database, the control circuit 80 determines the wavelength range of the light that is preferably removed.

Figure 9:
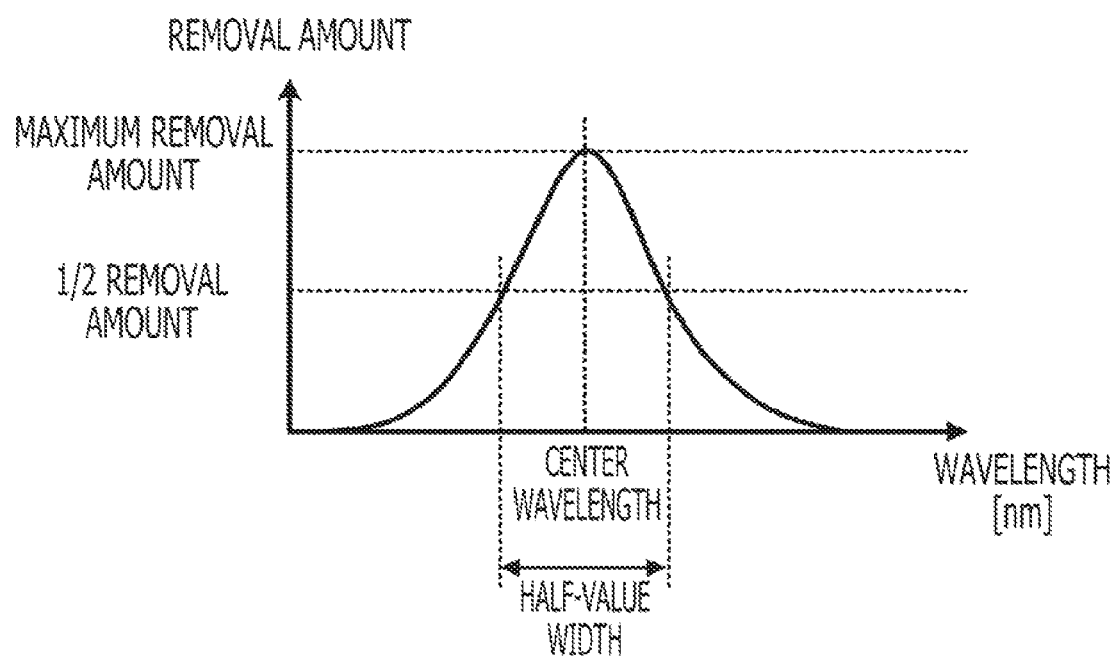
FIG. 9 is a graph illustrating an example of a reflection spectrum of a light that is removed by a fiber grating.

In general, to set the reflection rate of a prescribed wavelength to the highest rate, the fiber grating 31a has a reflection spectrum for reflecting the wavelength near the prescribed wavelength centering around the prescribed wavelength, with a prescribed reflection rate. FIG. 9 is an example of the reflection spectrum of the removal amount of the light in the fiber grating 31a when the prescribed wavelength is the center wavelength having the highest reflection rate. As illustrated in FIG. 9, the removal amount of the light becomes highest corresponding to the center wavelength and gradually decreases as the removal amount of the light deviates from the center wavelength.

In the reflection control circuit 90, the memory stores data indicating the wavelength spectrum of the removal amount regarding the fiber grating 31a in the optical fiber 30. By referring to the wavelength range of the light that is preferably removed and to the data indicating the reflection spectrum of the removal amount of the fiber grating 31a, the reflection control circuit 90 determines the center wavelength of the light that is removed by the fiber grating 31a.

Figure 10:
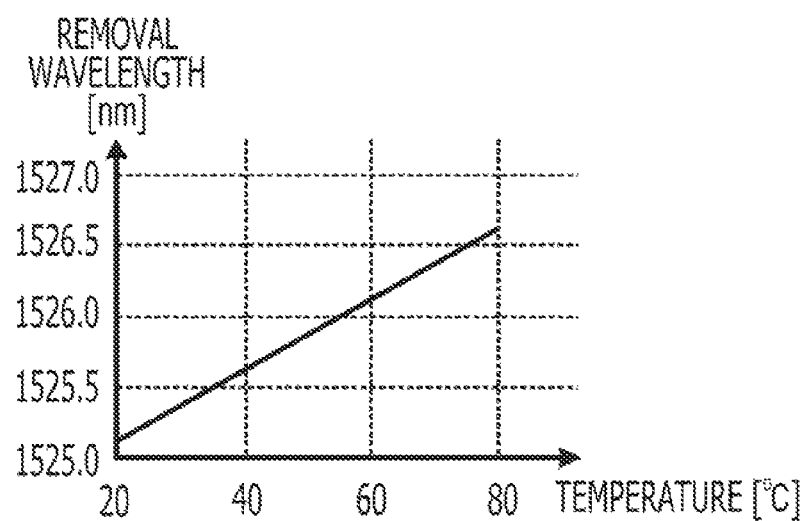
FIG. 10 is a graph illustrating an example of a relation between a temperature of a fiber grating and a wavelength of a light that is removed.

Regarding the fiber grating 31a, the wavelength range of the light that is removed varies according to the interval between the diffraction gratings. According to operations of the heater 91, the interval between the diffraction gratings in the fiber grating 31a may be varied by thermal expansion or contraction generated by changing a temperature of the optical fiber 30. FIG. 10 is an example of a relation between a temperature of the fiber grating 31a and a wavelength of the light that is removed. As illustrated in FIG. 10, regarding the fiber grating 31a, the wavelength range of the light that is removed according to the temperature is changed to be a linear form.

In the reflection control circuit 90, the memory stores data indicating a relation between the temperature of the fiber grating 31a and the wavelength of the light that is removed. The reflection control circuit 90 determines an instruction content to be reported to the heater 91 in such a way that the temperature of the fiber grating 31a is adjusted so that the center wavelength according to the wavelength range of the light that is preferably removed, which is determined as described above, becomes a removal wavelength in the fiber grating 31a.

Figure 11:
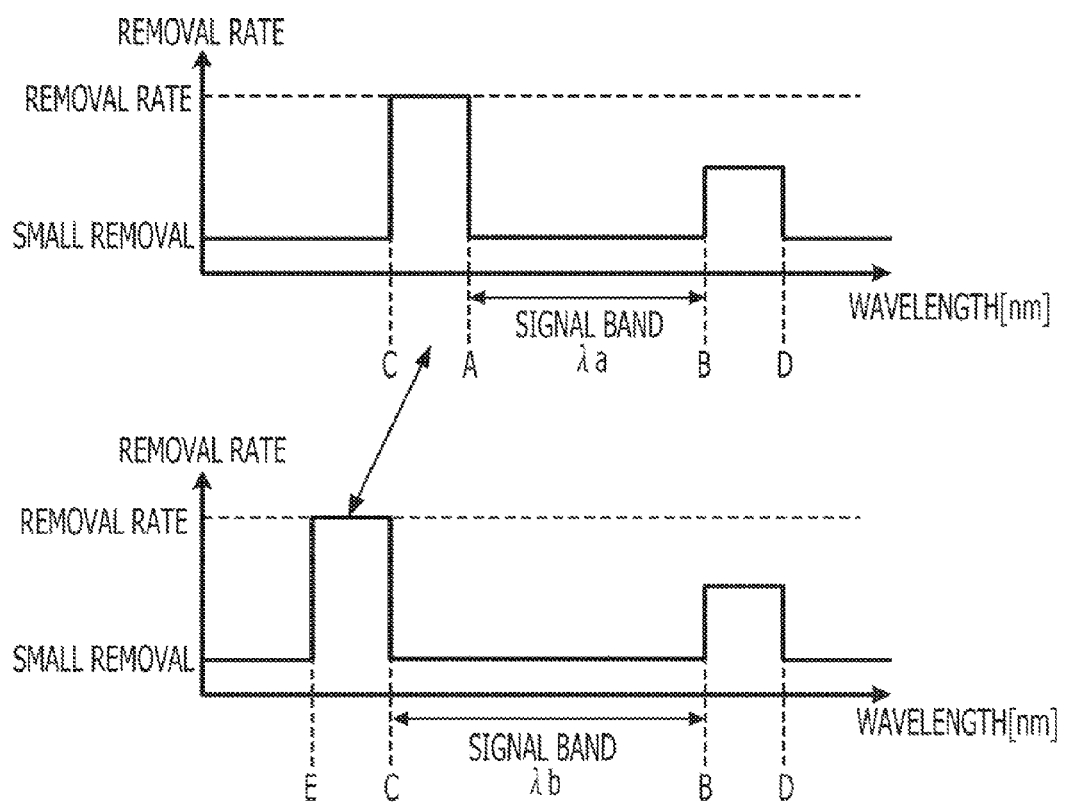
FIG. 11 is a graph illustrating an example of a mode of shift of a reflection wavelength according to a signal light wavelength.

The graph in FIG. 11 illustrates a mode of shift of the center wavelength of the reflection spectrum of the fiber grating 31a controlled by the reflection control circuit 90. FIG. 11 is a graph illustrating a mode of shift between the wavelength of the light, which is preferably removed by the fiber grating 31a if the wavelength of the input signal light Lin indicates a signal band $\lambda a$, and the wavelength of the light, which is preferably removed by the fiber grating 31a if the wavelength of the input signal light Lin indicates a signal band $\lambda b$. In the example illustrated in FIG. 11, if the signal band $\lambda a$ of the input signal light Lin is in the range of A to B (B>A), the fiber grating 31a provided in the optical fiber 30 is set to remove the light in the range of A to C (C<A) and the range of B to D (D>B). If the signal band $\lambda a$ of the input signal light Lin is changed into the signal band $\lambda b$ as the range of C to B, the reflection control circuit 90 controls the operations of the heater 91 to change the wavelength range of the light that is removed by the fiber grating 31a. Specifically, the reflection control circuit 90 instructs the heater 91 to change the temperature of the fiber grating 31a if the wavelength of the light that is removed is set to the range of C to A and to set the wavelength range of the light that is removed to the range of E to C (E<C). On the other hand, since no change is desired to be made in the range if the wavelength range of the light that is removed by the fiber grating 31a is set to the range of B to D, no instruction is made to change the temperature.

According to the above-described operations of the optical amplifier 1-1, the center wavelength of the reflection spectrum of the fiber grating 31a may be shifted depending on the wavelength of the input signal light Lin or the signal band. According to the plurality of input signal lights Lin in various wavelength ranges, excessive amplification of signal lights and generation of the noise light may be suppressed.

The optical amplifier 1-1 as the first deformed example of the optical amplifier 1 changes the wavelength of the light that is removed by changing the interval between the diffraction gratings in the fiber grating 31a. However, according to any other mode, the wavelength of the light that is removed by the filter 31 or the fiber grating 31a as an example of the filter 31 may be changed.

Figure 12:
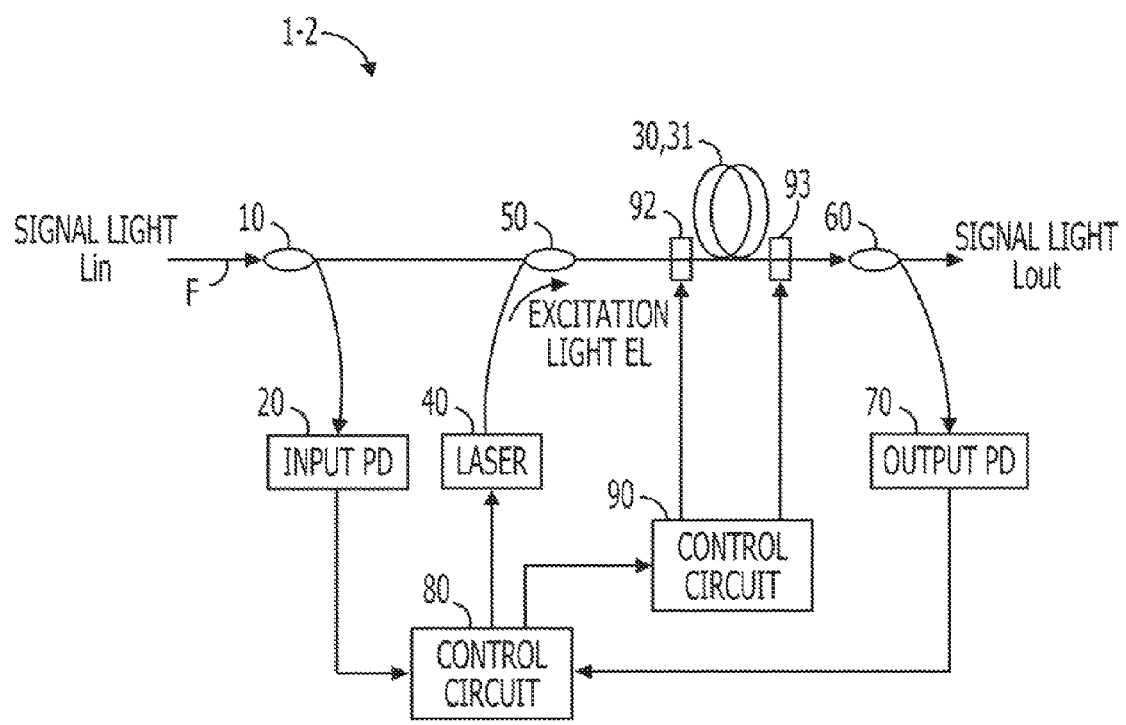
FIG. 12 is a diagram illustrating a second deformed example of an optical amplifier.

FIG. 12 is a block diagram illustrating a basic configuration of an optical amplifier 1-2 as a second deformed example of the optical amplifier 1. In FIG. 12, parts indicated with the numerals equivalent to FIG. 1 or FIG. 7 may have a configuration substantially equivalent to the above-described optical amplifier 1 or the optical amplifier 1-1 if the description is not made, so that the description is omitted.

As illustrated in FIG. 12, the optical amplifier 1-2 includes a tension sensor 92 coupled to the reflection control circuit 90 and an actuator 93.

The tension sensor 92 monitors and reports a tension, which is added to the optical fiber 30, to the reflection control circuit 90. The actuator 93 is a motor that is driven by adding a prescribed tension, which is determined under control of the reflection control circuit 90, to the optical fiber 30.

Figure 13:
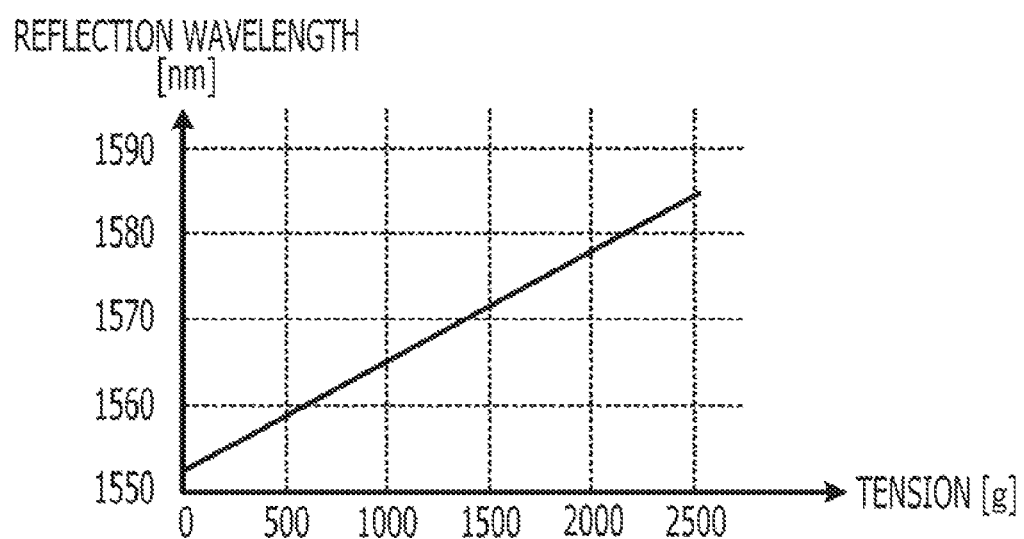
FIG. 13 is a graph illustrating an example of a relation between a tension that is added to an optical fiber and a wavelength of a light that is removed by a fiber grating.

The reflection control circuit 90 adjusts the interval between the diffraction gratings of the fiber grating 31a by operating the actuator 93 in such a way that the center wavelength according to the wavelength range of the light that is preferably removed, which is determined as described above, and the wavelength range become preferable removal objects. The graph illustrated in FIG. 13 is an example of a relation between the tension added to the optical fiber 30 and the wavelength of the light that is removed by the fiber grating 31a. As illustrated in FIG. 13, the fiber grating 31a changes the wavelength range of the light that is removed to be a linear form according to tension added to the optical fiber 30.

In the reflection control circuit 90, the memory stores the tension added to the optical fiber 30 and the data indicating the relation between the wavelength of the light that is removed by the fiber grating 31a. The reflection control circuit 90 controls the operation of the actuator 93 in such a way that the center wavelength according to the wavelength range of the light that is preferably removed, which is determined as described above, becomes a removal wavelength in the fiber grating 31a.

As described above, as with the optical amplifier 1-1, the optical amplifier 1-2 as the second deformed example of the optical amplifier 1 may shift the center wavelength of the reflection spectrum of the fiber grating 31a. Therefore, if the above-described configuration is used, the excessive amplification of the appropriate signal lights and the generation of the noise light may be suppressed according to the plurality of input signal lights Lin in various wavelength ranges.

(4) Effect

As described above, according to the optical amplifier 1, the optical amplifier 1-1, and the optical amplifier 1-2, the amplification efficiency of the signal light and the noise characteristics may be improved by removing the light with a specific wavelength from the optical fiber 30 in which amplification of a propagation light due to inductive emission is performed.

There are two cases for removing the light of the specific wavelength by the fiber grating 31a. One is a case where simply the light of the wavelength out of the signal band is removed, and the other one is a case where the light in the signal band is also removed.

If simply the light out of the signal band is removed, by suppressing the generation and amplification of the noise light such as the ASE light, decrease of energy of the inverted population in the optical fiber 30 may be suppressed by amplification that is not involved in the amplification of the light in the signal band. As a result, the amplification efficiency of the light in the signal band is improved. Since the power of the noise light may be reduced, the noise characteristics of the output signal light Lout may be largely improved.

In this case, slight removal of the signal in the signal band may be performed by the reflection spectrum of the removal amount by the fiber grating 31a. Therefore, the wavelength characteristics (for example, a removal amount, a center wavelength, and a half-value width) of the light that is removed by the fiber grating 31a is desired to be set in such a way that the deterioration of the amplification efficiency and the noise characteristics, which is caused by the removal of the light in the signal band, is suppressed.

On the other hand, if the light in the signal band is removed, by selectively removing the light with the wavelength that obtains an especially high amplification gain in the signal band, the excessive amplification is suppressed, and the gain difference of the signal light wavelength may be smoothed. As a result, the amplification efficiency of the light in the signal band may be improved. By removing the light out of the signal band as well, the generation and amplification of the noise light such as the ASE light are suppressed, so that the amplification efficiency and noise characteristics of the light out of the signal band may be improved.

Figure 14:
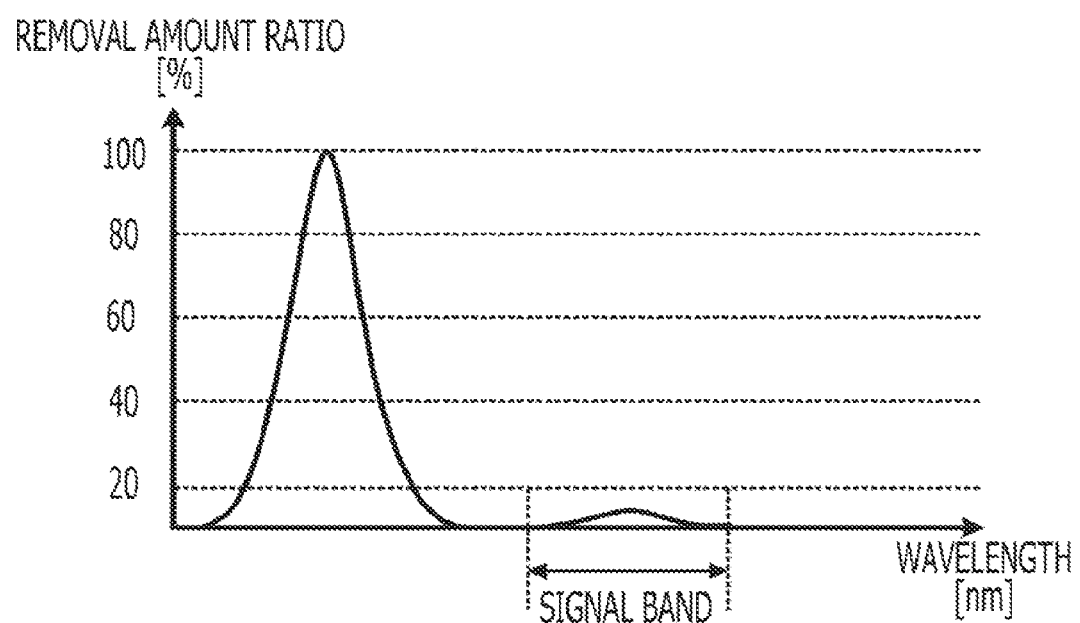
FIG. 14 is a graph illustrating an example of a removal amount ratio of a light in a signal band and a light out of the signal band.

On the other hand, by removing the light in the signal band, the deterioration of the amplification efficiency and the noise characteristics occurs. Especially, a large removal amount of the light in the signal band causes excessive suppression of the amplification effect. This may cause large deterioration of the amplification effect. The wavelength characteristics of the light that is removed are preferably set with high accuracy so that the deterioration of the amplification efficiency and the noise characteristics does not exceed an improvement effect. In general, regarding the fiber grating 31a, a design performance of the reflection spectrum related to the reflection rate is enhanced, and the wavelength characteristics with high accuracy may be set. This is useful to configure the filter 31. The removal amount of the light in the signal band is preferably set to be lower than the removal amount of the light out of the signal band. FIG. 14 is a graph illustrating an example of a ratio of the removal amount of the light for each wavelength. As illustrated in FIG. 14, in contrast to the removal amount of the signal out of the signal band, the removal amount of the light in the signal band is preferably set to approximately lower than 10%.

Figure 15A:
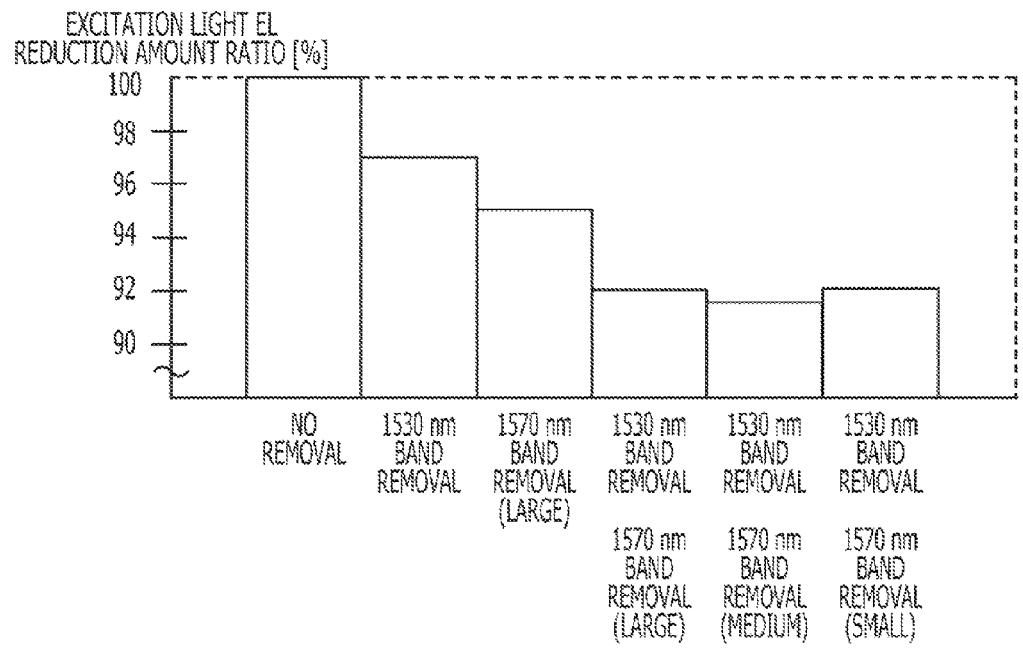
FIGS. 15A and 15B are a graph illustrating an example of a ratio of a reduction amount per unit length of an excitation light in an optical fiber and a ratio of a worst noise.
Figure 15B:
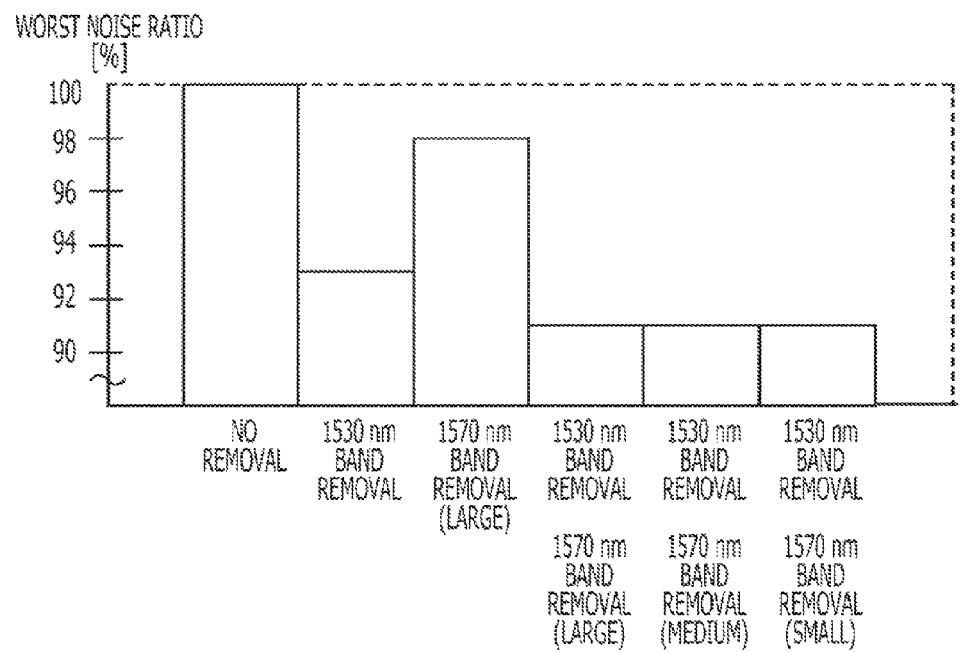

FIGS. 15A and 15B are graphs illustrating examples of a ratio of the reduction amount per unit length of the excitation light EL in the optical fiber 30 compared to the case where no removal is made by the filter 31 and of a ratio of the worst noise. FIG. 15A is a graph illustrating the ratio of the reduction amount per unit length of the excitation light EL compared to the case of no removal. FIG. 15B is a graph illustrating a ratio of the worst noise compared to the case of no removal. In each case, the signal band of the input signal light Lin is the wavelength range of 1553 nm to 1607.04 nm, which is called L-band, and combines the removal with the 1570 nm band as the center wavelength in the signal band with the removal with the 1530 nm band as the center wavelength out of the signal band. Regarding the removal amount per unit length in the optical fiber 30, if the removal amount of a case where the 1530 nm band out of the signal band as the center wavelength indicates 100%, the removal amount of a case where the 1570 nm band in the signal band as the center wavelength indicates (Small) 1.11%, (Medium) 1.20%, and (Large) 2.67%.

As illustrated in FIG. 15A, the reduction amount per unit length of the excitation light EL is reduced by 3% by removing the 1530 nm band out of the signal band. By removing the 1570 nm band in the signal band, the reduction amount is reduced by approximately 5%. By removing the 1570 nm band in the signal band and the 1530 nm band out of the signal band, the reduction amount is further reduced by approximately 8%.

As illustrated in FIG. 15B, by removing the 1530 nm band out of the signal band, the worst noise of the output signal light Lout is reduced by approximately 7%. By removing the 1570 nm band in the signal band, the worst noise of the output signal light Lout is reduced by approximately 2%. By removing the 1570 nm band in the signal band as well as the 1530 nm band out of the signal band, the worst noise of the output signal light Lout is reduced by approximately 9% in total. As described above, by removing the light out of the signal band, the worst noise may be further reduced compared to the removal of the light in the signal band, so that the noise characteristics may be improved.

Although the embodiments of the present invention have been described in detail, it should be understood that the various changes, substitutions, and alterations could be made hereto without departing from the spirit and scope of the invention. The embodiments of the present invention include the optical amplifier, the optical fiber, and the like with the changes. For example, the optical amplifier and the optical fiber may have a configuration of components other than the fiber grating as a filter.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. An optical amplifier, comprising:
   an optical fiber which includes a core in which a signal light is propagated and with which a rare-earth element is doped;
   a laser that is optically coupled to an end of the optical fiber, providing the optical fiber with an excitation light; and
   a filter which is formed in the optical fiber and removes a light within a wavelength range, from the core, among lights propagated in the core, wherein
   the filter comprises a first filter that is arranged at an area up to 10 meters away from an incidence end in the optical fiber and removes a first light in a 1530nm band, and a second filter that is arranged at an area more than 10 meters away from the incidence end in the optical fiber and removes a second light in a 1570nm band.

2. The optical amplifier according to claim 1, wherein the wavelength range of the light which is removed by the filter is determined based on a position along a propagation direction of the signal light in the optical fiber.

3. The optical amplifier according to claim 1, wherein the wavelength range of the light which is removed by the filter is determined based on the wavelength of the signal light and a degree of inverted population in the optical fiber.

4. The optical amplifier according to claim 1, wherein a prescribed wavelength range of the light which is removed by the filter comprises the wavelength of the signal light, and
   wherein the filter is set to remove a lower removal amount of the light of the wavelength of the signal light in comparison of the light out of the wavelength of the signal light in the wavelength range.

5. The optical amplifier according to claim 1, wherein the filter is a fiber grating which is formed in the core and comprises a Bragg diffraction grating with a prescribed angle with respect to a propagation direction of the signal light.

6. The optical amplifier according to claim 5, wherein a plurality of fiber gratings are formed in the core in a prescribed interval along the propagation direction of the signal light.

7. The optical amplifier according to claim 5, wherein the fiber grating is formed in the core along a length of the propagation direction of the signal light.

8. The optical amplifier according to claim 5, further comprising a reflection control circuit which performs control to change the wavelength range of the light which is removed by the filter.

9. The optical amplifier according to claim 8, wherein the reflection control circuit performs the control to change the wavelength range by changing the interval between the Bragg diffraction gratings in the fiber grating.

10. The optical amplifier according to claim 8, wherein the reflection control circuit performs the control to change the prescribed wavelength range of the light which is removed by the filter, by changing the interval between the Bragg diffraction gratings by stretching the fiber grating.

11. The optical amplifier according to claim 8, wherein a reflection control circuit controls the interval between the Bragg diffraction gratings by changing a temperature of the fiber grating.

12. The optical amplifier according to claim 1, wherein the wavelength range of the light which is removed by the filter is determined based on the wavelength of the signal light and the amplification gain with respect to the light propagated in the core determined based on the wavelength of the light propagated in the core and an inverted population degree in the optical fiber.

13. The optical amplifier according to claim 1, wherein the wavelength range of the light which is removed by the filter does not include the wavelength of the signal light.

14. An optical fiber comprising:
    a core with which a rare-earth element is doped and in which a signal light is propagated; and
    a filter which is formed in the optical fiber and removes a light within a wavelength range, from the core, among lights propagated in the core,
    wherein the filter comprises a first filter that is arranged at an area UP to 10 meters away from an incidence end in the optical fiber and removes a first light in a 1530nm band, and a second filter that is arranged at an area more than 10 meters away from the incidence end in the optical fiber and removes a second light in a 1570nm band.

* * * * *